June 3, 1952     I. SEMINARIO     2,599,490
AUTOMATIC LEVELING MECHANISM FOR LAND LEVELERS
Filed June 19, 1947     4 Sheets-Sheet 3
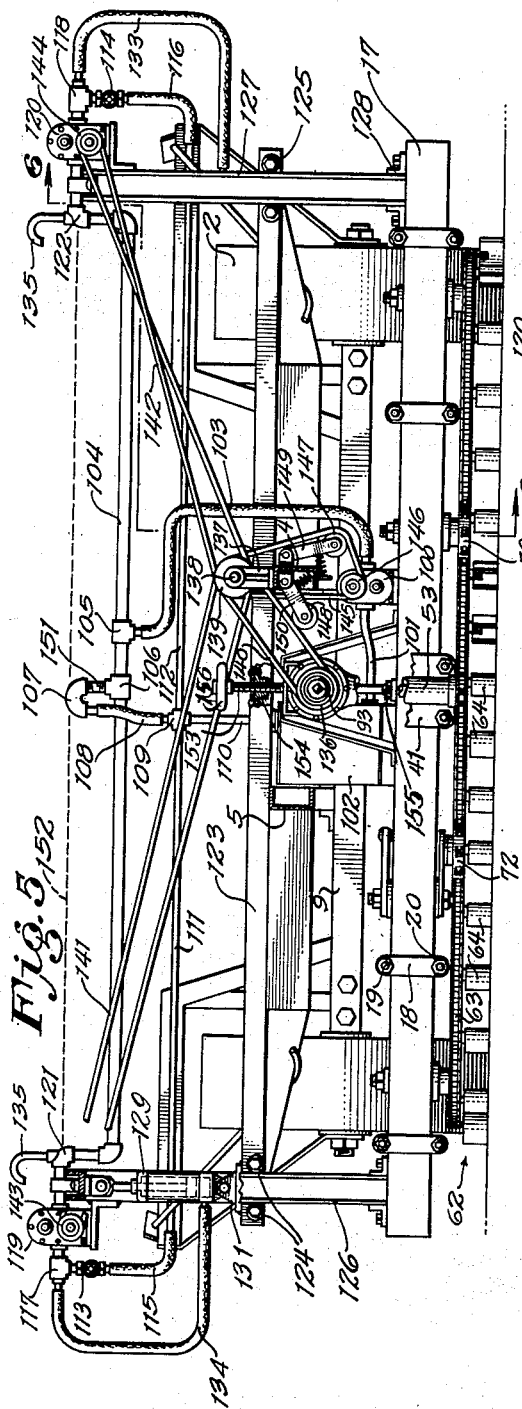
INVENTOR,
ISADORE SEMINARIO
BY
ATTORNEY June 3, 1952     I. SEMINARIO     2,599,490
AUTOMATIC LEVELING MECHANISM FOR LAND LEVELERS
Filed June 19, 1947     4 Sheets-Sheet 4
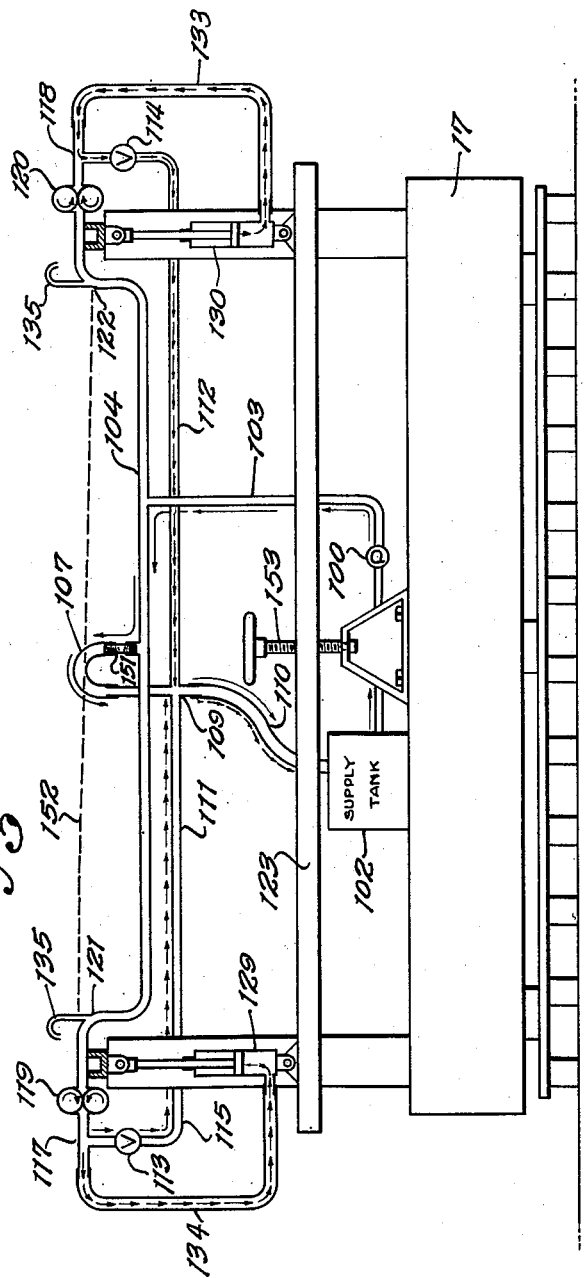
Inventor,
ISADORE SEMINARIO;
Attorney Patented June 3, 1952

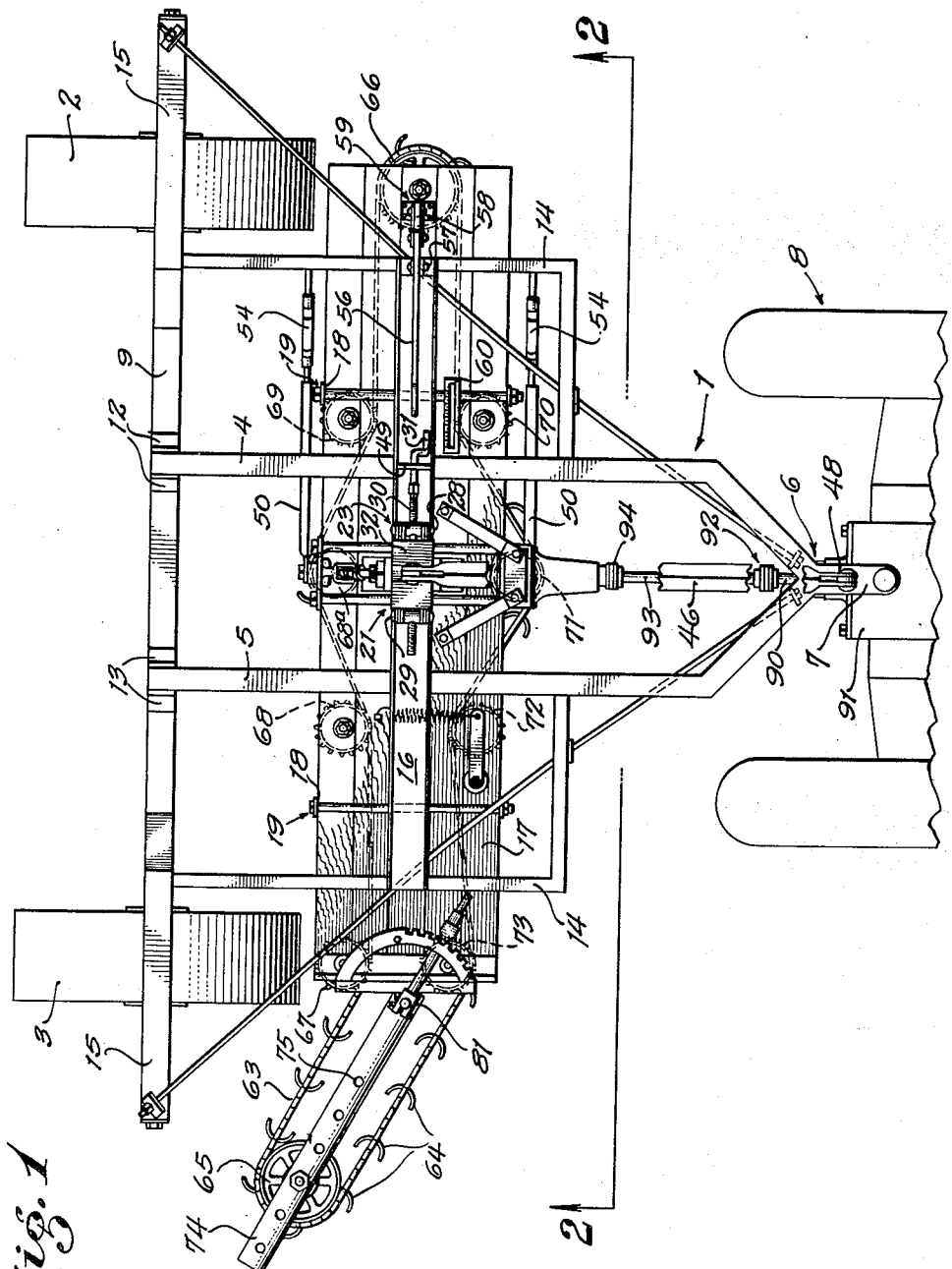

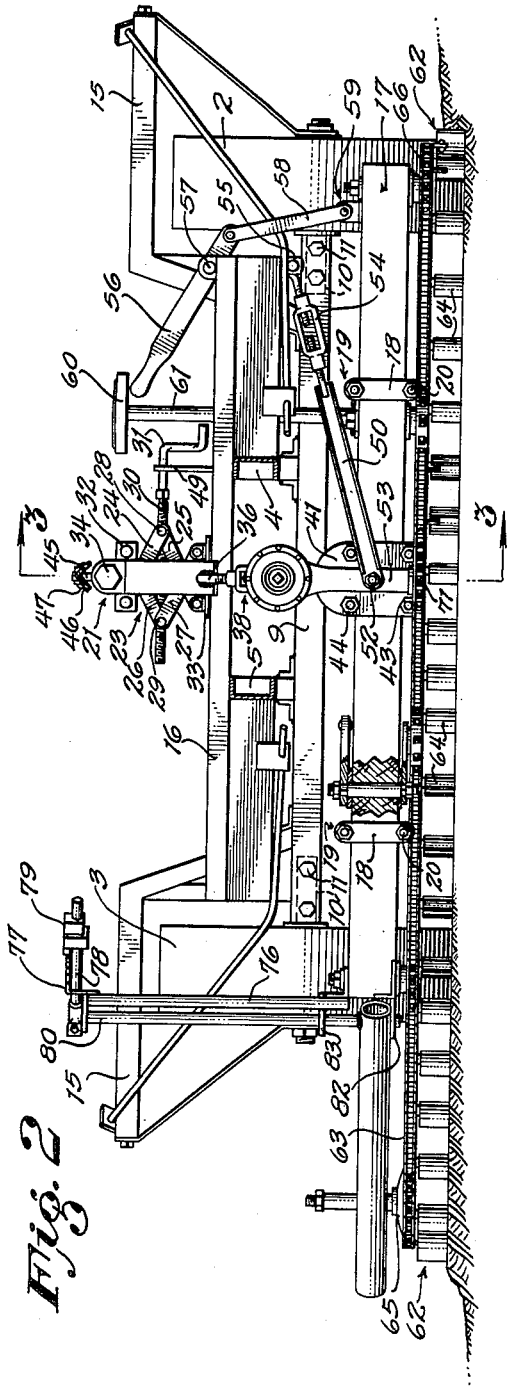

2,599,490

UNITED STATES PATENT OFFICE 2,599,490

AUTOMATIC LEVELING MECHANISM FOR LAND LEVELERS

Isadore Seminario, Lancaster, Calif.

Application June 19, 1947, Serial No. 755,635

3 Claims. (Cl. 37—108)

The present invention relates to levelers.

Devices of the present invention are utilized for the purpose of leveling a seed bed. It is common practice, where alfalfa is to be grown, to first roughly level the ground, followed by a further leveling between borders. A leveling is necessary to the end that after the seed is planted, the plot may be flooded with water. However, this so-called flooding must be accomplished so that the water is evenly spread over the plot. Heretofore, it has been customary to attempt to level the ground by means of horses, and in so doing, the ground is packed. This results in general unevenness of the ground, and perhaps of an individual crop of alfalfa. If the ground happens to be of the adobe type, such a tramping by horses or other vehicle, forms a hard crust.

The present invention provides a machine which is used on dry soil, and before any flooding thereof. The machine of the invention levels the ground to the end that water may spread evenly over the bed.

The invention has for further objects a leveler which is readily adjusted for height, capable of working over ground that is uneven as to border, and which produces superior results.

With the above mentioned and other objects in view, the invention consists in the novel and useful provision, formation, construction, association, and relative arrangement of parts, members and features, all as shown in several embodiments in the accompanying drawings, described generally, and more particularly pointed out in the claims.

In the drawings:

Figure 1 is a fragmentary top plan view of the leveler shown attached to a tractor, Figure 2 is a sectional view on the line 2—2 of Figure 1, Figure 3 is a fragmentary sectional view on the line 3—3 of Figure 2, Figure 4 is a perspective view of one of the scraper elements of the invention, Figure 5 is a view similar to Figure 2, but showing automatic means for leveling the scraper, Figure 6 is a sectional side elevation on the line 6—6 of Figure 5, and Figure 7 is a fluid flow diagram illustrating the operation of a hydraulic device for maintaining the platform of the invention in a given position.

Referring now with particularity to the drawings, and specifically to that form of the invention illustrated in Figures 1 to 4, inclusive, I have provided a frame 1 supported at one end by wheels 2 and 3. This frame includes two members 4 and 5 which merge at 6 and join with a short-length pole 7. This constitutes the draft portion, as the pole 7 is adapted to be secured to a tractor 8, whereby the leveler may be moved over the ground. Any type of connection may be utilized between the leveler and tractor, such as a pin received within a socket, or ball and socket. The members 4 and 5 are secured to frame member 9 which overlies and is secured to stud axles 10 for the wheels 2 and 3. The member 9 is channelled in section, as shown in Figure 3, and the axles 10 may be secured within the channel by means of bolts 11. As shown, the ends of the frame members 4 and 5 are secured to the top of the member 9, through the medium of brackets, designated generally as 12 and 13. To brace the frame, I have provided pairs of members 14, which connect the frame parts 4 and 5 with pairs of wheel-straddling frames 15 carried between the stud axles and the member 9. As shown in Figure 2, the frame parts 4 and 5 are preferably of channel cross section to give strength and to prevent weave, and the frame portions 14 and 15 may be of corresponding section.

Adapted to transversely span the frame members 4, 5, and 14, and to be connected thereto, is a channel sectioned frame member 16. This member functions to support, through suitable means to be described, a platform 17 suspended beneath the frame. The platform 17 comprises a plurality of members which are bound together in working relationship in any suitable manner, such as, for instance, by means of side ties 18. These ties include pairs of straps provided with openings through which and between which bolts may be passed and secured, as shown at 19 and 20. The number of ties will depend upon the length of the platform. The platform in the drawings is shown as planking and the ties provide a convenient means for securing the planking together. The platform must be quite rigid in structure. In other adaptations, the planking may be held together by passing bolts directly through transverse openings in the planking.

The platform is held adjustably suspended from the frame member 16 by means designated generally as 21. This means includes a pair of members 22 and 23 in the form of lazy tongs. Specifically, each lazy tongs includes links 24, 25, 26 and 27, the links 24 and 25 being connected by pin 28, and links 26 and 27 joined by pin 29.

The pins are transversely bored and screw-threaded to receive an oppositely pitched screw-threaded shaft 30. This shaft carries a crank 31 whereby, upon turning the crank, the links are caused to approach or separate. Links 24 and 26 are pinned to plate 32, while the ends of links 25 and 27 are pinned to a plate 33 carried on the frame member 16. The plate 32 is provided with a transversely positioned bolt 34 carrying nut 35. The bolt supports pendent straps 36 and 37 positioned on opposite sides of plate 32, which straps carry turn-buckles designated generally as 38, the members 39 of which are swingingly mounted on a tie rod 42 extending between plates 40 and 41. The plates 40 and 41 are positioned intermediate the length of and on opposite sides of the platform. These plates are clamped to the platform by means of lower and upper bolts 43 and 44 (see Figures 2 and 3).

The bolt 34 is provided with a vertical stud 45 which is secured to one end of a brace 46 by means of a pin 47, the opposite end of the brace being pinned to the pole 7 at 48. It is evident that when the crank 31 is rotated to move the screw shaft 30, the lazy tongs will raise or lower plate 32, which will cause movement of the brace 46. In order to assure that the crank 31 will always be in position of service, I have provided a bracket 49 which supports the crank.

As the platform is suspended substantially centrally thereof, I provide a means for preventing oscillation. This is accomplished by providing pairs of links 50. One of the links 50, as best shown in Figure 3, is pinned at one end 51 to plate 40, while the opposite link 50 is similarly pinned at 52 to a housing or casing 53. The opposite end of each link 50 has secured thereto a turn-buckle 54, each turn-buckle being rockably secured by means of a pin to brackets 55 carried by one of the frame members 14. It is evident that as the lazy tongs is actuated to raise or lower the platform, that the platform will move in an arc due to the presence of the links 50 with their associated turn-buckles. If the platform tilts during such movement, a lever 56 may be operated to return the platform to a horizontal position. The lever 56 is pivoted at 57 to a frame member 14, there being a link connection 58 between an end of the lever and means 59 secured to the platform. This lever is positioned substantially intermediate the links 50, as see Figure 1. To maintain the platform at either a given inclination or level, to wit, horizontal, I provide at 60 a conventional bubble type level, suitably mounted on a standard 61, the standard being fastened to the top of the platform.

The means for grading the ground is designated as an entirety by the numeral 62, and said means is positioned beneath the platform 17. The said means includes a continuous chain 63 carrying blades or scoops 64, the said chain being passed around end sprockets 65 and 66 and in contact with pairs of spaced sprockets 67, 68, 68a, 69, 70, 71, 72, and 73. The arrangement is such that the blades or scoops substantially traverse in part a path slightly greater than the width of the platform, to the end that the scoops or blades contact the earth in a manner such as to permit an efficient leveling thereof. The shaft for the sprocket 72 is spring-actuated to remove slack from the continuous chain 63. The sprocket 65 is carried by an arm 74 and is adjustable relative to said arm. The arm is provided with a series of bores 75 which are adapted to receive the shaft of the sprocket 65. The arm 74 is mounted for swinging movement whereby it may assume different angularities relative to a platform end. This is accomplished by providing one or more standards 76, which are fastened to the platform 17, the uppermost end of said standards supporting a segmental rack 77. A swing lever 78 carries a releasable dog 79 which plays over the teeth of the rack. The lever 78 is secured to the upper end of a shaft 80 by a clamp 81, while the lower end of shaft 80 is secured to and carries arm 74. This is accomplished by boring a hole through the said arm 74 and passing the shaft therethrough, there being a bearing bracket 82 for supporting a portion of the arm and the shaft end (see Figure 2). The shaft 80 is further braced by a bracket 83 secured to the top of the platform. The shaft 80 is so secured to the arm 74 that movement of the handle 78 produces swinging movement of the arm 74. This may be accomplished by welding or otherwise securing the shaft 80 to the arm 74.

The chain 63 is of the link type and may take the form illustrated in Figure 4, wherein a link 84 is pinned between two lugs 85 and 86, which lugs are fastened to the blade or scoop 64. The link has integrally formed therewith a sprocket tooth receiving portion 87, one end of which is provided with a hook 88. The hook 88 is adapted to be secured to a further link and, as shown in Figures 1 and 2, the blades or scoops are spaced apart.

The blades or scoops shown are semi-circular in form, the concave face portion 89 acting upon the earth formation so as to move it forwardly, as detailed in the statement of operation.

To cause movement of the continuous chain, I provide a power take-off from the tractor 8. Specifically, a shaft 90 extends from the differential in housing 91 and is coupled by means of a universal joint 92 to a short-length shaft 93 which, in turn, through the medium of a universal 94, is connected with shaft 95 in housing 96. The shaft 95 carries a bevel gear 97 in mesh with a bevel gear 98. Bevel gear 98 is mounted on a shaft 99 in housing or casing 53, the sprocket 71 being secured to the lower end of this shaft.

The form of the invention shown in Figures 5 and 6 depicts a hydraulic means for maintaining the platform in a horizontal position and is automatic as to operation, whereas the form of the invention shown in Figures 1 to 3, inclusive, is to be operated manually, having due reference to the level 60.

The hydraulic means includes a pump 100 having a connection 101 with tank 102 adapted to hold liquid, the output from said pump being directed through a hose 103 to pipe 104 by means of a T 105, interconnecting lengths of the pipe 104. A connector 106 in the pipe 104, positioned substantially intermediate the length of said pipe, communicates with a U connector 107. A flexible pipe 108 interconnects 107 with a cross coupling 109, the cross coupling being in direct communication with tank 102 through pipe 110. The cross coupling also connects with pipes 111 and 112, the ends of which latter pipes communicate with relief valves 113 and 114 through flexible tubes 115 and 116. The relief valves in turn connect with T connectors 117 and 118, the T's connecting with hydraulic pumps 119 and 120. The pipes 104 at each end communicate with the intake portions of pumps 119 and 120 through suitable pipe connections 121 and 122.

The platform 17 follows the same construction as that described for Figures 1 to 4, inclusive, and carries therebeneath a continuous chain 63 provided with blades or scoops 64. The frame member 123 is substantially of the same length as the platform and is supported by the frame members 4 and 5. Frame member 123 is channel in cross section and each leg adjacent the ends of the frame member carries spaced pairs of rollers 124 and 125. Yoke-type struts 126 and 127 (see Figure 6) are secured to the platform 17 adjacent each end thereof, as by means of small brackets designated generally as 128. As shown in Figure 6, the legs of the yoke-type strut pass between the pairs of rollers 124 and 125 so as to direct vertical movement of said struts. As shown in Figure 5, the upper ends of said struts carry the pumps 119 and 120. Cylinders 129 and 130 are positioned intermediate the yokes, one end of each cylinder being swingingly mounted by means designated generally as 131, to the frame member 123. Each cylinder has therein a piston, as shown in dotted lines in Figure 5, the rod connecting a piston being swingingly mounted, as shown generally at 132 (Figure 6) to the cross piece of a yoke.

Flexible pipes 133 and 134 connect with the T's 117 and 118, respectively, and with one end of the cylinders 129 and 130. It will be observed that the connections shown at 121 and 122 carry what may be known as breather pipes 135, the outlet ends of said breather pipes being at a certain height above pumps 119 and 120.

In order to drive the various pumps 100, 119 and 120, I provide a sheave 136 on shaft 93. The frame member 4 carries a bracket 137 which supports a shaft 138. This shaft has keyed or otherwise secured thereto a sheave 139 having four grooves, or there may be four independent sheaves keyed to the shaft. A continuous belt 140 is passed between the sheaves 136 and 139. Continuous belts 141 and 142 are passed between sheave 139 and sheaves 143 and 144, the last named sheaves being associated with pumps 119 and 120, respectively. For the purpose of driving pump 100, I provide a continuous belt 145 which is passed around sheave 139 and pump sheave 146. Tension in the belts 140 and 145 is maintained by spring-pressed idler rollers 147 and 148 carried by swing arms 149 and 150. These arms are mounted on brackets which are supported by frame member 4.

The operation, uses and advantages of the invention just described are as follows:

First taking that form of the invention illustrated in Figures 1 to 3, the pole 7 is secured to the rear end of the tractor, as shown in Figure 1, through the ball and socket provided for that purpose, to the end that the tractor may draw the leveler to the desired location. When at the desired location, the operator starts movement of chain 63 and lowers the platform 17 to regulate penetration of the blades or scoops in the ground by turning the crank 31. When the blades engage the ground, the platform may tilt. This is determined by the level 60, whereupon the operator moves the lever 56 to raise or lower one end of the platform until it is horizontal. As the tractor traverses the ground, the shaft 90 is rotated, which in turn will cause rotation of the sprocket 71 and drive the continuous chain 63. The arm 74 is turned to a selected position which may be either that illustrated in Figure 1, or some other position, depending upon the width of the seed bed. As a typical example, most seed beds are 20 feet in width and have borders of approximately 4 feet. Thus, the platform length is substantially 16 feet, and the arm 74 adds the additional 4 feet when it is extended horizontally of the platform. As the chain moves, the scoops or blades will grade the dirt in the manner illustrated in Figure 2. The wide-tread wheels 2 and 3 follow on the graded dirt and therefore ride on leveled ground. If the border is irregular, the operator may release the dog from engagement with the rack teeth and shift the arm 74 to a new location.

The device of Figures 5 and 6 is adapted to automatically maintain the platform level. When the shaft 93 is rotated, all of the continuous belts are moved to cause operation of the pumps 100, 119 and 120. The U connection 107 is adjustable as to height through the oppositely threaded connection 151 with T connection 106.

As long as the platform 17 remains in a horizontal or level position, the fluid circulates from the tank 102 through pump 100 into the flexible line 103, the connection 105, adjustable connection 151, U connection 107, flexible pipe 108, and through pipe 110 to the tank 102. The line 104, leading to and including the elbows or pipe connections 121 and 122, contains fluid up to the level indicated by the dotted line 152. The fluid in the line 104 and elbows 121 and 122 is free to move either to the right or to the left as the right or left end of the platform 17 is tipped or elevated, due to a change in the transverse grade. The dotted line 152 indicates the level of the fluid in the connections 121 and 122 when the platform 17 is level and is equal to the overflow level of the liquid as it passes through the U connection 107, which is below the level of the inside diameter of the pipes leading to the pumps 119 and 120. As the platform member 17 is tipped in either direction, one or the other of the pumps 119 and 120 will be lowered because of their connection to the U-shaped yoke member 126. As either of the pumps 119 or 120 is lowered, liquid will flow to the lowermost pump because the inside diameter of the pipe leading to the pump has been lowered below the liquid level 152. As the fluid flows into either pump, it is forced through line 133 or 134 to cylinders 129 or 130 to actuate the pistons therein, thereby raising the yoke member 126 or 127 with respect to the frame. It should be noted that the lines 115 and 116 connected through the relief valves 113 and 114 and T connections 117 and 118 to the lines 133 and 134 provide a means for by-passing a small amount of the liquid being forced through the lines 133 and 134; and when the platform 17 again becomes level, the relief valves 113 or 114 will allow a slight amount of liquid to return to the tank 102, thus lowering the yoke member 126 or 127, which will, in turn, again start the levelling cycle.

The platform 17 may be initially adjusted as to height in the form of the invention shown in Figure 5, through the medium of a long screw 153, the screw being passed through a threaded nut 154, carried by frame member 123, the lower end of said screw carrying a ball fitted within a socket, the socket of which is secured to the platform 17, as indicated at 155. The upper end of the screw carries a hand wheel 156. Thus, the platform 17 may be initially adjusted for height, whereupon the hydraulic system described will maintain the platform level, to the end that the scoops 64 will have proper formation contact to level the formation.

I claim:

1. A leveler including a dirigible frame, a platform suspended from said frame intermediate its length, hydraulic cylinders mounted on each end of the frame and connected to the adjacent end of the platform, a hydraulic pump, having an inlet and an outlet, for each hydraulic cylinder, supported by the platform and positioned adjacent said cylinders, a liquid line extending between the inlets of said pumps, and a liquid line between the outlet of each pump and its cylinder, a third hydraulic pump having an inlet and an outlet and a liquid line from the outlet of said third pump to the line connecting the inlets of the other two pumps and a liquid line returning to said third pump and connected to the liquid line which extends between the inlets of the first named pumps, said liquid line having an adjustable liquid overflow portion to position the same at a certain level relative to the axis of the inlet level of said first named pumps, means for driving all of said pumps, and whereby when the platform assumes a given level, liquid is by-passed from the third named pump into the liquid line and returned thereto, and when the platform is tilted from a determined level, liquid is directed to one or the other of said first named pumps to be received in one of the hydraulic cylinders to raise or lower the platform to maintain its determined level.

2. A leveler, including a dirigible frame, a platform adjustably suspended intermediate its length from said frame, hydraulic cylinders mounted on each end of the frame and connected to the adjacent end of the platform, first and second hydraulic pumps supported by the platform, in liquid connection with said cylinders, a third hydraulic pump supported by the platform, a liquid line extending between the first and second hydraulic pumps, and means for directing liquid from said third hydraulic pump into said line to one or the other of said first and second hydraulic pumps, dependent upon the tilting of the platform to raise or lower the platform to level the same.

3. A leveler, including a dirigible frame, a platform transversely positioned beneath said frame, scraper blades carried beneath said platform, an elevator supported by the frame, link members between said elevator and the platform for suspending the platform intermediate its length, hydraulic cylinders mounted on each end of the frame and connected to the adjacent end of the platform, a hydraulic pump supported by the platform for each hydraulic cylinder and in liquid connection with said cylinders, a third hydraulic pump supported by the platform, a liquid line extending between the inlet portions of the hydraulic pumps for said hydraulic cylinders, and means for directing liquid from the third named hydraulic pump into said liquid line to one or the other of the said first named hydraulic pumps, dependent upon tilting of the platform and said scraper blades, to raise or lower the platform and blades to level the same.

ISADORE SEMINARIO.

REFERENCES CITED

The following references are of record in the file of this patent:

UNITED STATES PATENTS

| Number | Name | Date |
|---|---|---|
| 460,919 | Lasher | Oct. 6, 1891 |
| 1,722,725 | Wheeler | July 30, 1929 |
| 1,778,690 | Scheuchzer | Oct. 14, 1930 |
| 1,936,518 | McColm | Nov. 21, 1933 |
| 2,027,685 | Flynn | Jan. 14, 1936 |
| 2,128,273 | Stevens | Aug. 30, 1938 |